No. 859,093. PATENTED JULY 2, 1907.
S. MASTERS.
FASTENING MEANS FOR CAMS AND THE LIKE.
APPLICATION FILED JUNE 23, 1906.
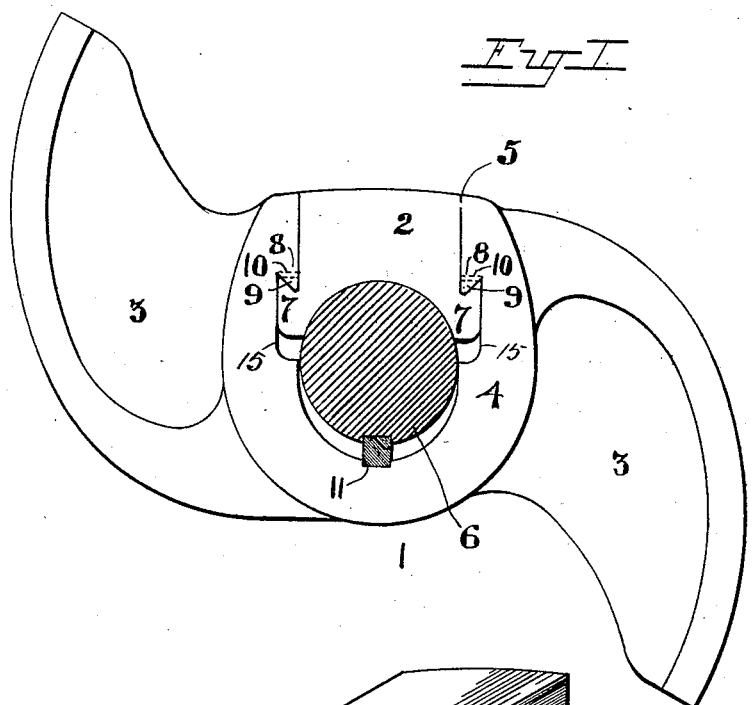
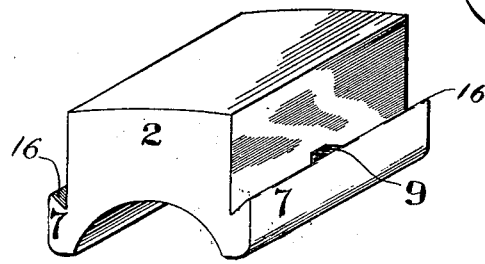
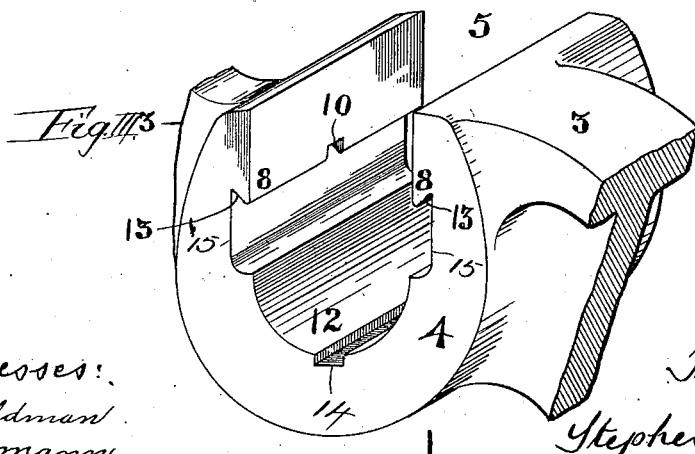
Witnesses:
L. Waldman
C. Heymann
Inventor:
Stephen Masters
by B. Singer
atty
THE NORRIS PETERS CO., WASHINGTON, D. C.

UNITED STATES PATENT OFFICE.

STEPHEN MASTERS, OF CLEVELAND, TRANSVAAL.

FASTENING MEANS FOR CAMS AND THE LIKE.

No. 859,093.  Specification of Letters Patent.  Patented July 2, 1907.

Application filed June 23, 1906. Serial No. 323,067.

*To all whom it may concern:*

Be it known that I, STEPHEN MASTERS, a British subject, residing at the New Heriot Gold Mining Company, Limited, Cleveland, in the Colony of the Transvaal, have invented certain new and useful Improvements in Fastening Means for Cams and the Like, of which the following is a specification, reference being had therein to the accompanying drawing.

This invention relates to an improved construction adapted for use in connection with cams, split pulleys and the like of that class which are formed in two parts and adapted to be applied and removed to and from a shaft without unseating the same from its bearings. In this class of devices it is highly desirable to provide the separable parts or members with means serving not only to prevent radial but also to prevent longitudinal displacement of said member with respect to the shaft. It is further desirable in locking the separable members in place to avoid as much as possible the employment of separate locking members and therefore the most efficient devices, and those which withstand the greatest strain and wear, are those which are provided with integral interlocking parts.

The device of this invention therefore comprises a member, which may be either a cam, a pulley or other similar device, and which is divided into two elements each being provided with interlocking members adapted, when thrown into engagement with each other to effectively prevent either radial or longitudinal displacement.

In the most improved embodiment of the device means is provided for forcing said elements into locking engagement and said means serves to positively engage one of said members and the shaft in such a manner as to effectively lock said members against rotation.

The invention will be more fully explained in connection with the accompanying drawing and will be more particularly pointed out and ascertained in and by the appended claims.

In the drawing:—Figure I illustrates in cross section a shaft to which is secured a two part cam designed for stamp mills wherein there is embodied the main features of my invention, the cam being shown in elevation. Fig. II. is a perspective view of one portion of said cam illustrating the same detached from its co-operative part. Fig. III. is a perspective view of the remaining portion of the cam, the cam portions being broken away.

Like numerals of reference designate similar parts throughout the different figures of the drawing.

As shown in the drawing:—The cam members 3 are provided with a hub portion or member divided into two elements, 1 and 2. Preferably the cam members 3 are formed integral with the member 1 which as shown constitutes the major portion of the hub, the element 2 constituting mainly a locking member. The element or member 1 is of a generally U-shaped formation the inner lower wall portion 12 being substantially equal in diameter to the diameter of the shaft to which the cam is applied and is provided with a keyway 14. Said element 1 is also laterally recessed at 15, preferably on both sides to form locking ways the upper walls 13 thereof being inclined downwardly. Preferably midway between the ends of said recesses or locking ways 15 the upper walls 13 are recessed at 10 to provide locking notches the purpose of which will hereinafter more fully appear. The side portions of said element 1 extend upwardly from the wall 13 forming parallel engaging faces 8. The other or remaining element 2 is provided with lateral extensions 7 adapted to seat in the locking ways 15. The upper portions 16 of said extensions 7 are inclined upwardly and are adapted to form an interlocking engagement with the walls 13 in a manner to prevent radial displacement of the elements 2 and 1. Preferably midway between the ends of said element 2 there are provided locking lugs 9 adapted to engage the notches or recesses 10 and prevent longitudinal displacement of said elements. Means is provided for forcing said elements 1 and 2 into locking engagement so that their interfitting parts serve to prevent radial and longitudinal displacement and preferably said means in performing the function also serves to lock said members against rotation on shaft 6. As shown, a key 11 is provided to perform this dual function said key engaging the groove or keyway 14 in the element 1 and a similar groove or keyway in the shaft 6.

In all devices of this character, especially with cams designed for heavy work and where the thrust or strain is intermittent instead of constant, it is necessary to provide means for positively locking the parts against rotation and it will be seen from the foregoing construction that this feature is not only fully realized but the locking parts themselves are provided with interlocking members formed integral so as to dispense with the usual separate parts for preventing longitudinal or radial displacement.

I claim:—

1. A divided cam provided with a boss portion, slotted out from the bore to pass over the cam shaft, a block fitting such slot, there being interlocking longitudinal side shoulders upon the parts, and lugs upon the one part co-acting with recesses upon the other part to prevent relative longitudinal movement of the parts, and means for forcing the shoulders together.

2. In combination, a shaft, a member divided into two elements adapted to embrace said shaft, each element being provided with integral co-operating interlocking portions for preventing radial displacement of said elements with respect to each other, and each of said elements being also provided with integral co-operating interlocking portions for preventing longitudinal displacement of said elements with respect to each other, and means for forcing said elements into interlocking engagement with each other and locking said elements non-rotatively upon the shaft.

3. In combination, a shaft, a member divided into two elements adapted to embrace said shaft, each element being provided with integral co-operating interlocking portions for preventing radial displacement of said elements with respect to each other, and each of said elements being also provided with integral co-operating interlocking portions for preventing longitudinal displacement of said elements with respect to each other, and a key engaging key-ways in said shaft and in one of said elements, said key being of size sufficient to force said elements into interlocking engagement with each other, said key also locking said elements non-rotatively upon the shaft.

In testimony whereof I affix my signature in presence of two witnesses.

STEPHEN MASTERS.

Witnesses:
HAROLD ERNEST KISCH,
JABEZ WARREN VENNING.